(12) United States Patent
Snyder

(10) Patent No.: US 12,729,662 B1
(45) Date of Patent: Sep. 8, 2026

(54) HYBRID IGNITOR

(71) Applicant: RTX Corporation, Farmington, CT (US)

(72) Inventor: Timothy S. Snyder, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/348,981

(22) Filed: Oct. 3, 2025

(51) Int. Cl.
*F02M 57/06* (2006.01)
*F02C 7/266* (2006.01)
*F02K 9/95* (2006.01)

(52) U.S. Cl.
CPC ............. *F02M 57/06* (2013.01); *F02C 7/266* (2013.01); *F02K 9/95* (2013.01)

(58) Field of Classification Search
CPC ........... H01T 15/00; H01T 21/00; H01T 2/00; H01T 1/00; H01T 13/00; F02M 57/06; F02C 7/266; F02K 9/95
See application file for complete search history.

(56) References Cited

U.S. PATENT DOCUMENTS 4,122,816 A * 10/1978 Fitzgerald ............... F02P 9/007 123/620
5,010,728 A 4/1991 Joy
6,374,592 B1 * 4/2002 Box ........................ F02C 7/264 60/39.464
8,783,009 B2 * 7/2014 Khosid ................... F02C 7/272 60/39.821
10,527,004 B2 * 1/2020 Whitmore ................. F02K 9/72
2024/0263600 A1 * 8/2024 Kamps ..................... B64G 1/40

FOREIGN PATENT DOCUMENTS

JP 3702348 B1 10/2005
JP 5529650 B2 6/2014

* cited by examiner

*Primary Examiner* — Kyle Robert Thomas
(74) *Attorney, Agent, or Firm* — Bachman & LaPointe, P.C.

(57) ABSTRACT

A hybrid ignitor including an ignitor body with an ignitor wall defining an ignitor interior and an ignitor exterior, the ignitor body having an electrode end opposite a discharge end; a central electrode disposed within the ignitor interior, the central electrode including a spark end; a ground electrode disposed within the ignitor interior and electrically coupled with the central electrode near the spark end; an air inlet formed in the ignitor wall near the spark end; and a solid fuel disposed within the ignitor interior near the discharge end and near the spark end of the central electrode and downstream of the air inlet.

20 Claims, 3 Drawing Sheets

HYBRID IGNITOR

BACKGROUND

The present disclosure is directed to an improved start mechanism for small engines. Particularly, a hybrid ignitor.

For a prior art small engine E as shown in FIG. 1, the gas turbine engine E requires a charge of compressed air or rapidly expanding gas to initially start the gas turbine engine E. The initial charge of compressed air requires a portable volume of air to start the engine and a pyrotechnic start cartridge to ignite the combustor. This volume is conventionally held in a separate pressure vessel (cartridge) V attached to the small engine E. The separate pressure vessel (cartridge) V adds weight, cost and part count to the small engine design.

SUMMARY

In accordance with the present disclosure, there is provided a hybrid ignitor comprising an ignitor body with an ignitor wall defining an ignitor interior and an ignitor exterior, the ignitor body having an electrode end opposite a discharge end; a central electrode disposed within the ignitor interior, the central electrode including a spark end; a ground electrode disposed within the ignitor interior and electrically coupled with the central electrode near the spark end; an air inlet formed in the ignitor wall near the spark end; and a solid fuel disposed within the ignitor interior near the discharge end and near the spark end of the central electrode and downstream of the air inlet.

A further embodiment of any of the foregoing embodiments may additionally and/or alternatively include the solid fuel comprises materials in a solid phase which are inert prior to ignition and subsequently ignite responsive to a spark generated by the central electrode and ground electrode.

A further embodiment of any of the foregoing embodiments may additionally and/or alternatively include the solid fuel is attached to the interior surface and defines a fuel flow passage.

A further embodiment of any of the foregoing embodiments may additionally and/or alternatively include the solid fuel comprises a fuel interior surface proximate the fuel flow passage, the fuel interior surface having a shape with ridges and valleys configured for maximum surface area to contact air.

A further embodiment of any of the foregoing embodiments may additionally and/or alternatively include the discharge end defines a discharge nozzle configured to flow an ignition source from the ignitor interior into a combustion chamber.

A further embodiment of any of the foregoing embodiments may additionally and/or alternatively include the central electrode is configured to generate an ignition spark in cooperation with the ground electrode.

A further embodiment of any of the foregoing embodiments may additionally and/or alternatively include the air inlet fluidly couples the ignitor interior with air in an air supply passage fluidly coupled with a compressor section.

In accordance with the present disclosure, there is provided a gas turbine with a hybrid ignitor comprising a case supporting a combustion section having a combustion chamber; an ignitor body attached to the case, the ignitor body comprising an ignitor wall defining an ignitor interior and an ignitor exterior, the ignitor body having an electrode end opposite a discharge end, the discharge end disposed within the combustion chamber; a central electrode disposed within the ignitor interior, the central electrode including a spark end; a ground electrode disposed within the ignitor interior and electrically coupled with the central electrode near the spark end; an air inlet formed in the ignitor wall near the spark end; and a solid fuel disposed within the ignitor interior near the discharge end and near the spark end of the central electrode and downstream of the air inlet.

A further embodiment of any of the foregoing embodiments may additionally and/or alternatively include the air inlet fluidly couples the ignitor interior with air in an air supply passage fluidly coupled with a compressor section of the gas turbine.

A further embodiment of any of the foregoing embodiments may additionally and/or alternatively include the air supply passage is further configured to fluidly couple the compressor section to the combustion chamber, to provide at least one of rich air or lean air to the combustion chamber.

A further embodiment of any of the foregoing embodiments may additionally and/or alternatively include the discharge end defines a discharge nozzle configured to flow an ignition source from the ignitor interior into the combustion chamber.

A further embodiment of any of the foregoing embodiments may additionally and/or alternatively include the central electrode is configured to generate an ignition spark in cooperation with the ground electrode.

A further embodiment of any of the foregoing embodiments may additionally and/or alternatively include the solid fuel comprises a fuel interior surface defining a fuel flow passage and having a shape with ridges and valleys configured for maximum surface area to contact air in the fuel flow passage.

A further embodiment of any of the foregoing embodiments may additionally and/or alternatively include the solid fuel is an inert material in standard atmospheric environments; and the solid fuel contains no oxidizer.

In accordance with the present disclosure, there is provided a process of forming a gas turbine with a hybrid ignitor comprising: forming an ignitor body with an ignitor wall defining an ignitor interior and an ignitor exterior, the ignitor body having an electrode end opposite a discharge end; disposing a central electrode within the ignitor interior, the central electrode including a spark end; disposing a ground electrode within the ignitor interior and electrically coupling the ground electrode with the central electrode near the spark end; forming an air inlet in the ignitor wall near the spark end; and disposing a solid fuel within the ignitor interior near the discharge end and near the spark end of the central electrode and downstream of the air inlet.

A further embodiment of any of the foregoing embodiments may additionally and/or alternatively include the process further comprising fluidly coupling the air inlet between the ignitor interior and an air supply passage; and fluidly coupling the air supply passage with a compressor section of the gas turbine.

A further embodiment of any of the foregoing embodiments may additionally and/or alternatively include the process further comprising forming the solid fuel comprising materials in a solid phase which are inert prior to ignition and subsequently ignite responsive to a spark generated by the central electrode and ground electrode.

A further embodiment of any of the foregoing embodiments may additionally and/or alternatively include the process further comprising forming a discharge nozzle within the discharge end; configuring the discharge nozzle to flow an ignition source from the ignitor interior into a combustion chamber.

A further embodiment of any of the foregoing embodiments may additionally and/or alternatively include the process further comprising forming a fuel flow passage through the solid fuel, the solid fuel comprising a fuel interior surface having a shape with ridges and valleys configured for maximum surface area to contact air within the fuel flow passage.

A further embodiment of any of the foregoing embodiments may additionally and/or alternatively include the process further comprising forming the solid fuel as an inert material in standard atmospheric environments; and the solid fuel containing no oxidizer.

Other details of the hybrid ignitor are set forth in the following detailed description and the accompanying drawings wherein like reference numerals depict like elements.

BRIEF DESCRIPTION OF THE DRAWINGS

The above and further advantages of this disclosure may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. The embodiments shown in the individual figures are not limiting and can be combined to reflect a blended concept. For clarity, not every element may be labeled in every figure. The drawings are not necessarily to scale, emphasis instead being placed upon illustrating the principles of the disclosure.

DETAILED DESCRIPTION

Figure 1:
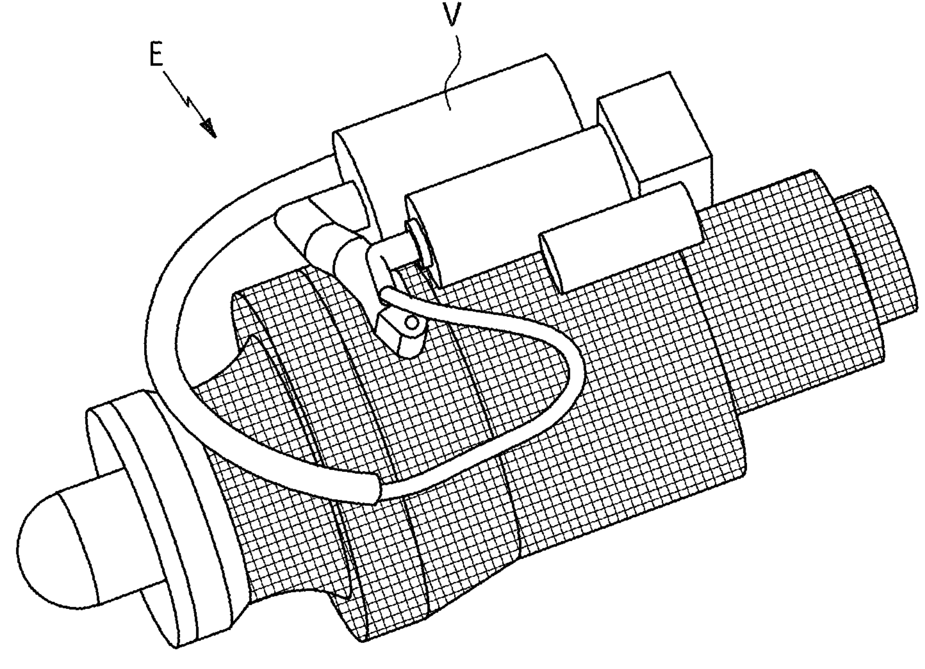
FIG. 1 is an isometric view of a schematic representation of a prior art gas turbine engine.
Figure 2:
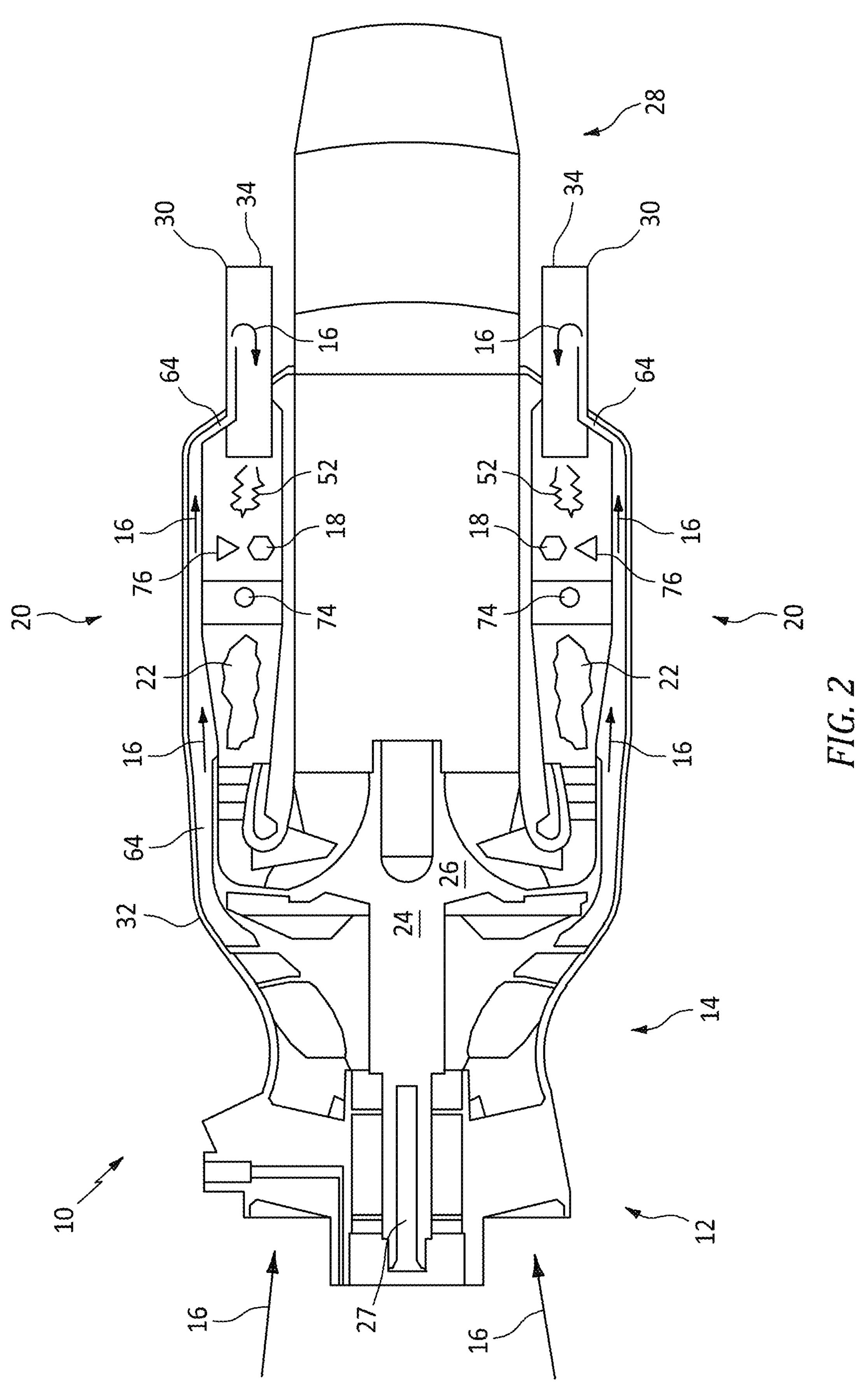
FIG. 2 is a cross sectional view schematic representation of an exemplary gas turbine engine with hybrid ignitor.

Referring now to FIG. 2, there is illustrated an exemplary gas turbine engine, specifically a turbojet engine 10. The gas turbine engine 10 includes an inlet section 12 upstream of a compressor section 14 where air 16 is drawn in and compressed. Fuel 18 is injected into a combustion section 20 downstream of the compressor section 14. The air 16 is mixed with the fuel 18 and burned in the combustion section 20. The combusted fuel 18 and air 16 are combined into a highly energized combustion product 22 (products of combustion 22) that expands through a turbine section 24. The products of combustion 22 move downstream over turbine rotors 26, driving the turbine rotors 26 to rotate creating rotary power. The rotary power can be used to spin the compressor 14 and/or power the generator 27. The products of combustion 22 move downstream and exit the turbine section 24 through the exhaust nozzle section 28 where engine thrust is developed for propulsion. The engine 10 may also include the generator 27 such as an anterior-mounted, permanent magnet generator (PMG). The generator 27 may operate in two modes, one as a generator to generate electricity, the other as a motor to spin the turbine 24 to spool up the engine 10 for starting the engine 10.

Figures 3, 4:
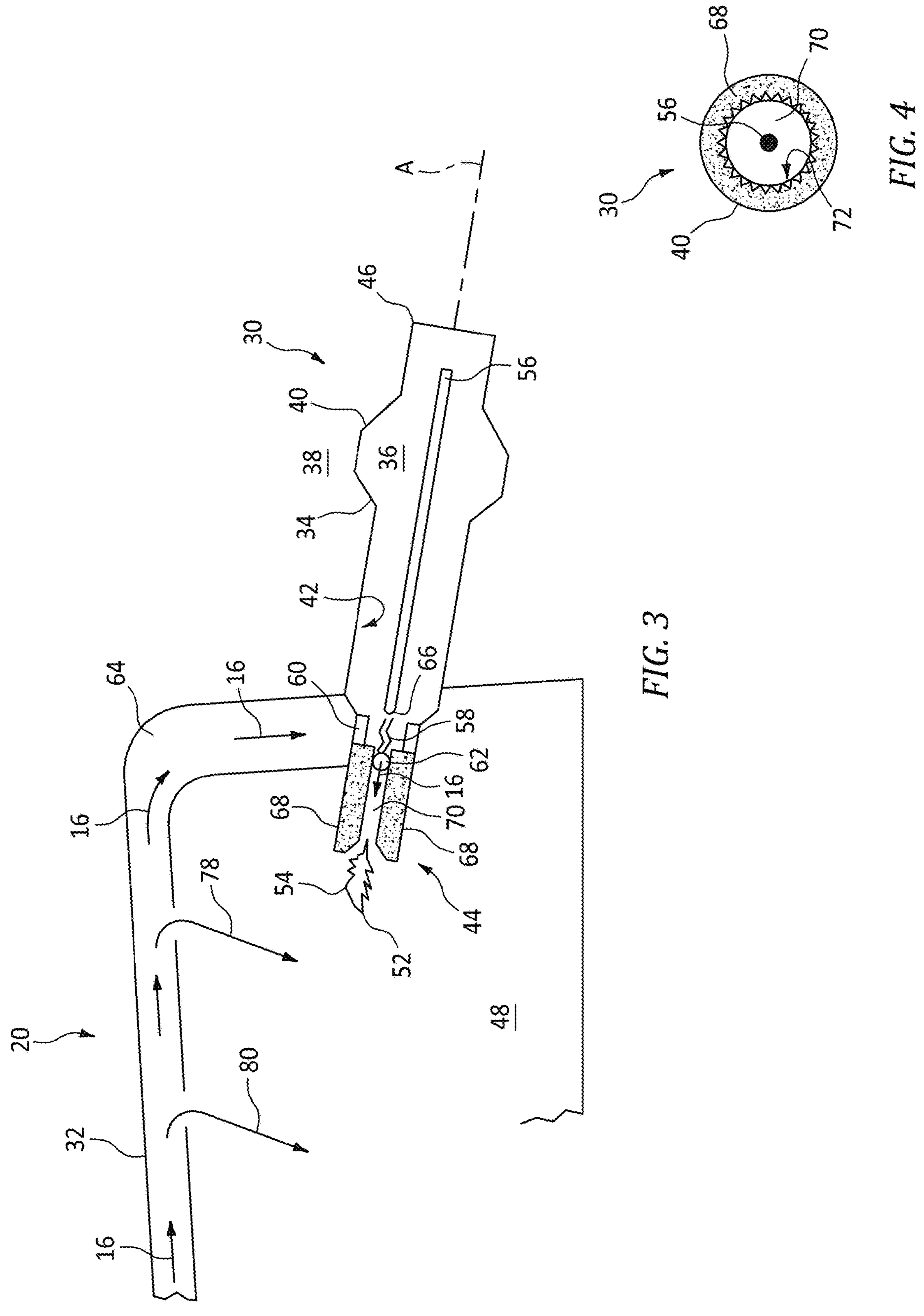
FIG. 3 is a cross sectional view schematic representation of the exemplary hybrid ignitor.
FIG. 4 is an end view schematic representation of an exemplary discharge portion of the exemplary hybrid ignitor.

Referring also to FIG. 3 and FIG. 4, an exemplary hybrid ignitor 30 can be attached to a case 32 near the combustion section 20. The hybrid ignitor 30 can be fluidly coupled with the air 16. The hybrid ignitor 30 can include an ignitor body 34 that attaches with the case 32 near the combustion section 20. The ignitor body 34 defines an ignitor interior 36 and an ignitor exterior 38 separated by an ignitor wall 40. The ignitor wall 40 includes an interior surface 42. The ignitor body 34 includes a discharge end 44 opposite an electrode end 46. The discharge end 44 is adapted to be inserted into a combustion chamber 48 of the combustion section 20. The discharge end 44 is open and defines a discharge nozzle 50 configured to flow an ignition source 52 such as products of combustion including hot gases with a fuel/spark/flame 54 from the ignitor interior 36 into the combustion chamber 48.

The hybrid ignitor 30 includes a central electrode 56. The central electrode 56 can be located within the ignitor interior 36 along an axis A. The central electrode 56 can be configured to generate an ignition spark 58 in cooperation with a ground electrode 60. The ground electrode 60 is located along the interior surface 42 near an end of the central electrode 56 proximate the discharge end 44 (e.g., spark end 66 of the central electrode 56).

The hybrid ignitor 30 includes an air inlet 62 formed in the ignitor wall 40 allowing for fluid communication between the ignitor interior 36 and the ignitor exterior 38. More particularly, the air inlet 62 enables fluidly coupling the ignitor interior 36 with the air 16 flowing along an air supply passage 64. The air supply passage 64 can be fluidly coupled with the compressor section 14. The air supply passage 64 can fluidly couple with the air 16 flowing into the inlet section 12. There can be multiple air inlets 62. The air inlet 62 can be located near a spark end 66 of the central electrode 56 and the ground electrode 60.

The hybrid ignitor 30 includes a solid fuel 68 attached to the ignitor wall 40 on the interior surface 42 near the discharge end 44. The solid fuel 68 can be near the spark end 66 of the central electrode 56. The solid fuel 68 can be located downstream of the air inlet 62. The solid fuel 68 can form a fuel flow passage 70 that fluidly couples the ignitor interior 36 with the combustion chamber 48. The fuel flow passage 70 allows for the flow of the ignition source 52 from the ignitor interior 36 to the combustion chamber 48. The solid fuel 68 can be constructed from materials that can maintain a solid phase, be inert prior to ignition and subsequently ignite due to a chemical reaction.

The solid fuel 68 can burn with the airflow 16 from air inlet 62 after the solid fuel 68 is ignited by the ignition spark 58. The products of combustion 54 generate the hot gases that create the ignition source 52 to ignite the liquid fuel 18 in the combustion chamber 48. The solid fuel 68 provides a continuous source of solid fuel 68 to burn with the air 16 entering via the air inlet 62, which provides a continuous ignition source 52 from the rapid combustion chemical reaction of the solid fuel 68. The solid fuel 68 provides the energy of the ignition source 52.

The hybrid ignitor 30 can be designed to induce sparking and engine ignition. The hybrid ignitor 30 can include the solid fuel 68 that can create energized ignition source gases 52 that can propagate along the fuel flow passage 70 into the combustion section 20. The hybrid ignitor 30 can include the solid fuel 68 that is an inert material in standard atmospheric and sub-atmospheric environments. The solid fuel 68 does not include an oxidizer. Alternatively, the solid fuel may include a small amount of oxidizer to supplement the air 16 from airflow inlet 62. It is desirable to formulate the solid fuel 68 from materials that are not considered to be explosive to avoid an explosive designation of pyrotechnic igniters.

As seen in FIG. 4, the solid fuel 68 can be shaped to form a fuel interior surface 72 that lines the fuel flow passage 70. The fuel interior surface 72 can be shaped to maximize the surface area of contact for the solid fuel 68. The fuel interior surface 72 can be shaped with ridges and valleys that allow for the maximum surface area to contact the air 16. The fuel interior surface 72 can be shaped with irregular undulations, grooves, zig zags, and the like to modify the rate of combustion.

The air inlet 62 is configured to flow the air 16 to sustain the ignition source 52 after the ignition spark 58 ignites the solid fuel 68. The air inlet 62 also allows for and drives the fluid flow of the fuel/spark/flame 54 through the fuel flow passage 70 and out of the discharge nozzle 50 into the combustion chamber 48 for a sufficient amount of time to ignite a fuel air mixture 74 in the combustion chamber 48 and ultimately provide a steady state production of the combustion product 22.

The ignition source 52 can attain temperatures above the auto ignition temperature of the fuel 18. The ignition source 52 can contribute to an increase in energy being supplied to the engine 10. The ignition source 52 can contribute a relatively large amount of energy in a relatively short period of time. The ignition source 52 can contribute to fully spooling up the rotors 26 for engine startup.

In operation, the hybrid ignitor 30 can be idle prior to the need for engine 10 startup. The hybrid ignitor 30 can be inert and have a long storage life under normal storage conditions. Upon startup of the engine 10, the hybrid ignitor 30 can be initiated by activating the central electrode 56 and ground electrode 60 to create the ignition spark 58 to ignite the solid fuel 68 mixed with the air 16 flowing through inlet 62. A fuel 18 flow can begin through a fuel injector 76 in the combustion section 20. The hybrid ignitor 30 can energize and provide the ignition source 52, such as the products of combustion with hot gases from the solid fuel/spark/flame 54 that is carried into the combustion chamber 48 in the vicinity of the liquid fuel air mixture 74 within the combustion section 20. The solid fuel 68 burns and provides enough energy to ignite the fuel air mixture 74 and to turn the rotor 26 of the turbine section 24. The engine 10 can spool up to full power. The ignition source 52 can be extinguished after consumption of the solid fuel 68 mixed with the air 16. The ignition source 52 can ignite the fuel air mixture 74 to produce the combustion products 22. The engine 10 can operate at a normal running speed and provide enough air flow and fuel supply to operate with self-sustaining power in the combustion section 20. After the solid fuel 68 material is expended and the engine 10 spools up, the engine 10 transitions to a normal, self-sustaining operation.

The air 16 supplied into the air inlet 62 from the compressor section 14 can also be supplied to the combustion section 20. The air 16 can be supplied as rich air 78 at a location near the discharge end 44 of the hybrid ignitor 30. The rich air 78 is supplied to provide sustaining oxygen during rich burn of the fuel air mixture 74. The air 16 from the compressor section 14 can also be supplied as quench or lean air 80 within the combustion section 20. The lean air 80 can be employed during lean burn of the fuel air mixture 74. The quantity of solid fuel 68 and air 16 within the hybrid ignitor 30 can be sized to provide sufficient energy to light off the fuel air mixture 74 and maintain light off until a stable fuel air mixture 74 burner state is obtained. The temperature and pressure of the fuel 18 and air 16 within the combustion section 20 can vary depending on the operating conditions of the engine 10, such as the altitude. The quantity of solid fuel 68 and air 16 supply can be tailored to ensure adequate ignition source 52 quantities for light off. At certain high altitude conditions, an ignition spark 58 by itself may not be enough to sustain light off.

A technical advantage of the disclosed hybrid ignitor includes a readily available startup energy source for the engine.

Another technical advantage of the disclosed hybrid ignitor includes a source for ignition in the combustion section.

Another technical advantage of the disclosed hybrid ignitor includes a simple, compact, and reliable ignition source for an engine.

Another technical advantage of the disclosed hybrid ignitor includes a compact device configured for simple installation and packaging in a production engine design.

Another technical advantage of the disclosed hybrid ignitor includes solid fuel with little to no oxidizer.

There has been provided a hybrid ignitor. While the hybrid ignitor has been described in the context of specific embodiments thereof, other unforeseen alternatives, modifications, and variations may become apparent to those skilled in the art having read the foregoing description. The embodiments can be interchanged and combined. Accordingly, it is intended to embrace those alternatives, modifications, and variations which fall within the broad scope of the appended claims.

What is claimed is:

1. A hybrid ignitor comprising:

an ignitor body with an ignitor wall defining an ignitor interior and an ignitor exterior, the ignitor body having an electrode end opposite a discharge end;

a central electrode disposed within the ignitor interior, the central electrode including a spark end;

a ground electrode disposed within the ignitor interior and electrically coupled with the central electrode near the spark end;

an air inlet formed in the ignitor wall near the spark end; and a solid fuel disposed within the ignitor interior near the discharge end and near the spark end of the central electrode and downstream of the air inlet.

2. The hybrid ignitor according to claim 1, wherein the solid fuel comprises materials in a solid phase which are inert prior to ignition and subsequently ignite responsive to a spark generated by the central electrode and ground electrode.

3. The hybrid ignitor according to claim 1, wherein the solid fuel is attached to the interior surface and defines a fuel flow passage.

4. The hybrid ignitor according to claim 3, wherein the solid fuel comprises a fuel interior surface proximate the fuel flow passage, the fuel interior surface having a shape with ridges and valleys configured for maximum surface area to contact air.

5. The hybrid ignitor according to claim 1, wherein the discharge end defines a discharge nozzle configured to flow an ignition source from the ignitor interior into a combustion chamber.

6. The hybrid ignitor according to claim 1, wherein the central electrode is configured to generate an ignition spark in cooperation with the ground electrode.

7. The hybrid ignitor according to claim 1, wherein the air inlet fluidly couples the ignitor interior with air in an air supply passage fluidly coupled with a compressor section.

8. A gas turbine with a hybrid ignitor comprising:

a case supporting a combustion section having a combustion chamber; an ignitor body attached to the case, the ignitor body comprising an ignitor wall defining an ignitor interior and an ignitor exterior, the ignitor body having an electrode end opposite a discharge end, the discharge end disposed within the combustion chamber;

a central electrode disposed within the ignitor interior, the central electrode including a spark end;

a ground electrode disposed within the ignitor interior and electrically coupled with the central electrode near the spark end;

an air inlet formed in the ignitor wall near the spark end; and a solid fuel disposed within the ignitor interior near the discharge end and near the spark end of the central electrode and downstream of the air inlet.

9. The gas turbine with the hybrid ignitor according to claim 8, wherein the air inlet fluidly couples the ignitor interior with air in an air supply passage fluidly coupled with a compressor section of the gas turbine.

10. The gas turbine with the hybrid ignitor according to claim 9, wherein the air supply passage is further configured to fluidly couple the compressor section to the combustion chamber, to provide at least one of rich air or lean air to the combustion chamber.

11. The gas turbine with the hybrid ignitor according to claim 8, wherein the discharge end defines a discharge nozzle configured to flow an ignition source from the ignitor interior into the combustion chamber.

12. The gas turbine with the hybrid ignitor according to claim 8, wherein the central electrode is configured to generate an ignition spark in cooperation with the ground electrode.

13. The gas turbine with the hybrid ignitor according to claim 8, wherein the solid fuel comprises a fuel interior surface defining a fuel flow passage and having a shape with ridges and valleys configured for maximum surface area to contact air in the fuel flow passage.

14. The gas turbine with the hybrid ignitor according to claim 8, wherein the solid fuel is an inert material in standard atmospheric environments; and the solid fuel contains no oxidizer.

15. A process of forming a gas turbine with a hybrid ignitor comprising:

forming an ignitor body with an ignitor wall defining an ignitor interior and an ignitor exterior, the ignitor body having an electrode end opposite a discharge end;

disposing a central electrode within the ignitor interior, the central electrode including a spark end;

disposing a ground electrode within the ignitor interior and electrically coupling the ground electrode with the central electrode near the spark end;

forming an air inlet in the ignitor wall near the spark end; and disposing a solid fuel within the ignitor interior near the discharge end and near the spark end of the central electrode and downstream of the air inlet.

16. The process of claim 15, further comprising:

fluidly coupling the air inlet between the ignitor interior and an air supply passage; and fluidly coupling the air supply passage with a compressor section of the gas turbine.

17. The process of claim 15, further comprising:

forming the solid fuel comprising materials in a solid phase which are inert prior to ignition and subsequently ignite responsive to a spark generated by the central electrode and ground electrode.

18. The process of claim 15, further comprising:

forming a discharge nozzle within the discharge end; and configuring the discharge nozzle to flow an ignition source from the ignitor interior into a combustion chamber.

19. The process of claim 15, further comprising:

forming a fuel flow passage through the solid fuel, the solid fuel comprising a fuel interior surface having a shape with ridges and valleys configured for maximum surface area to contact air within the fuel flow passage.

20. The process of claim 15, further comprising:

forming the solid fuel as an inert material in standard atmospheric environments; and the solid fuel containing no oxidizer.

* * * * *